US008019840B2

United States Patent
McDougall et al.

(10) Patent No.: US 8,019,840 B2
(45) Date of Patent: Sep. 13, 2011

(54) STORAGE AREA NETWORK MAPPING

(75) Inventors: David McDougall, Newcastle, CA (US);
Harry E Kellogg, Granite Bay, CA
(US); Paulene M. Purdy, Roseville, CA
(US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2665 days.

(21) Appl. No.: 10/284,966

(22) Filed: Oct. 31, 2002

(65) Prior Publication Data
US 2004/0088366 A1 May 6, 2004

(51) Int. Cl.
*G06F 15/173* (2006.01)
*G06F 15/16* (2006.01)
(52) U.S. Cl. .......... 709/223; 709/217; 709/220
(58) Field of Classification Search .......... 709/220, 709/223; 711/114, 1
See application file for complete search history.

(56) References Cited

U.S. PATENT DOCUMENTS

| | | | | |
|---|---|---|---|---|
| 6,346,954 B1 * | 2/2002 | Chu et al. | ...... | 715/764 |
| 6,665,714 B1 * | 12/2003 | Blumenau et al. | ...... | 709/222 |
| 6,671,776 B1 * | 12/2003 | DeKoning | ...... | 711/114 |
| 6,697,924 B2 * | 2/2004 | Swank | ...... | 711/163 |
| 6,839,747 B1 * | 1/2005 | Blumenau et al. | ...... | 709/223 |
| 6,845,395 B1 * | 1/2005 | Blumenau et al. | ...... | 709/223 |
| 6,854,035 B2 * | 2/2005 | Dunham et al. | ...... | 711/117 |
| 7,159,080 B1 * | 1/2007 | Coatney et al. | ...... | 711/147 |
| 2002/0103889 A1 * | 8/2002 | Markson et al. | ...... | 709/223 |
| 2002/0196744 A1 * | 12/2002 | O'Connor | ...... | 370/254 |
| 2003/0033398 A1 * | 2/2003 | Carlson et al. | ...... | 709/223 |
| 2003/0055932 A1 * | 3/2003 | Brisse | ...... | 709/223 |
| 2003/0208581 A1 * | 11/2003 | Behren et al. | ...... | 709/223 |
| 2003/0233510 A1 * | 12/2003 | Umbehocker et al. | ...... | 711/100 |

OTHER PUBLICATIONS

The definition of the term "collate" obtained from Merriam-Webster online dictionary from the Internet at: http://www.merriam-webster.com/dictionary/collate.*

* cited by examiner

*Primary Examiner* — Kamal Divecha

(57) ABSTRACT

A computerized method for determining whether a storage device detected in a SAN is associated with a storage array detected in the SAN, where the storage array has one or more storage devices associated therewith. The computerized method includes obtaining identifying information for the detected storage device, obtaining identifying information for the one or more storage devices associated with the detected storage array, and processing the obtained information to determine whether the detected storage device is one of the one or more storage devices associated with the detected storage array.

15 Claims, 4 Drawing Sheets

STORAGE AREA NETWORK MAPPING

BACKGROUND OF THE INVENTION

Storage area networks (SANs) are increasingly used, particularly in business enterprises, to enable network servers to share storage arrays and/or storage devices. It is important for those managing such networks to be able to keep track of and to change storage configurations quickly, easily and flexibly. Accordingly, SAN management software commonly provides for topology mapping, wherein all devices and connections of the network are sought to be discovered and displayed. Typically, host agents discover devices physically or logically connected thereto, and report these discoveries to a management server. The management server processes this information from the hosts to identify associations between various devices in the network, and then produces a topology map.

In some cases, the SAN management software is unable to detect associations between certain devices in the network. Take, for example, the simplified SAN shown in FIG. 1, which includes a tape library having multiple internal tape drives and a robot/controller. As shown in FIG. 1, tape drive 1 and the robot/controller are attached to bridge 1, while tape drives 2, 3 are attached to bridge 2. A host connected to the SAN and using the tape library detects logical unit numbers (LUNs) for each of the tape drives, as well as one for the robot/controller. The host uses these LUNs when communicating with the tape library to request a tape (from the robot/controller) or to write/read data to/from a tape drive.

Unlike the robot/controller, however, the tape drives cannot identify the tape library to which they belong. When SAN management software communicates with the tape drives, the drives can identify themselves, and can even indicate that they belong to a tape library, but they cannot identify the specific tape library to which they belong. Thus, the SAN management software cannot determine that the tape drives connected to bridge 2 belong to the same tape library as tape drive 1 and the robot/controller. Therefore, the topology map produced by the SAN management software may appear like that shown in FIG. 2. Because the topology map shown in FIG. 2 only depicts the tape library generally, and not the individual tape drives and the robot/controller associated with the tape library, it appears from the map that no devices are attached to bridge 2. As recognized by the inventors hereof, this may be confusing to and mislead individuals interpreting the topology map because, in this example, there are actually two tape drives attached to bridge 2. The inventors have also recognized that, even if the management software was configured to produce a topology map that depicts the individual tape drives shown in FIG. 1, the map would still fail to illustrate that tape drives 2, 3 are associated with the same tape library as tape drive 1 and the robot/controller. Instead, such a map would depict tape drives 2, 3 as stand-alone tape drives connected to bridge 2 (or to bridge 1, if the SAN of FIG. 1 was so configured), which could likewise confuse and/or mislead individuals reading the map.

SUMMARY OF THE INVENTION

To solve these and other problems in the prior art, the inventors hereof have succeeded at designing devices and methodologies for determining whether a storage device detected in a storage area network (SAN) is one of multiple storage devices associated with a storage array detected in the SAN.

According to one embodiment of the present invention, a computerized method for determining whether a storage device detected in a SAN is associated with a storage array detected in the SAN, where the storage array has one or more storage devices associated therewith. The computerized method includes obtaining identifying information for the detected storage device, obtaining identifying information for the one or more storage devices associated with the detected storage array, and processing the obtained information to determine whether the detected storage device is one of the one or more storage devices associated with the detected storage array.

Further areas of applicability of the present invention will become apparent from the detailed description provided below. It should be understood that the detailed description and specific examples, while indicating exemplary embodiments of the invention, are for purposes of illustration only and should not be construed as limiting the scope of the invention.

DETAILED DESCRIPTION OF EXEMPLARY EMBODIMENTS

According to one embodiment of the present invention, a computer device is configured for determining whether a storage device detected in a storage area network (SAN) is one of one or more storage devices associated with a storage array detected in the SAN. By determining this, the computer device enables a topology map to be produced for the SAN which accurately reflects links and/or associations between various devices in the SAN, particularly in the case where the detected storage device is, in fact, one of the storage devices associated with the detected storage array. An exemplary application and operation of such a computer device will now be described with reference to FIGS. 3 and 4.

Figure 3:
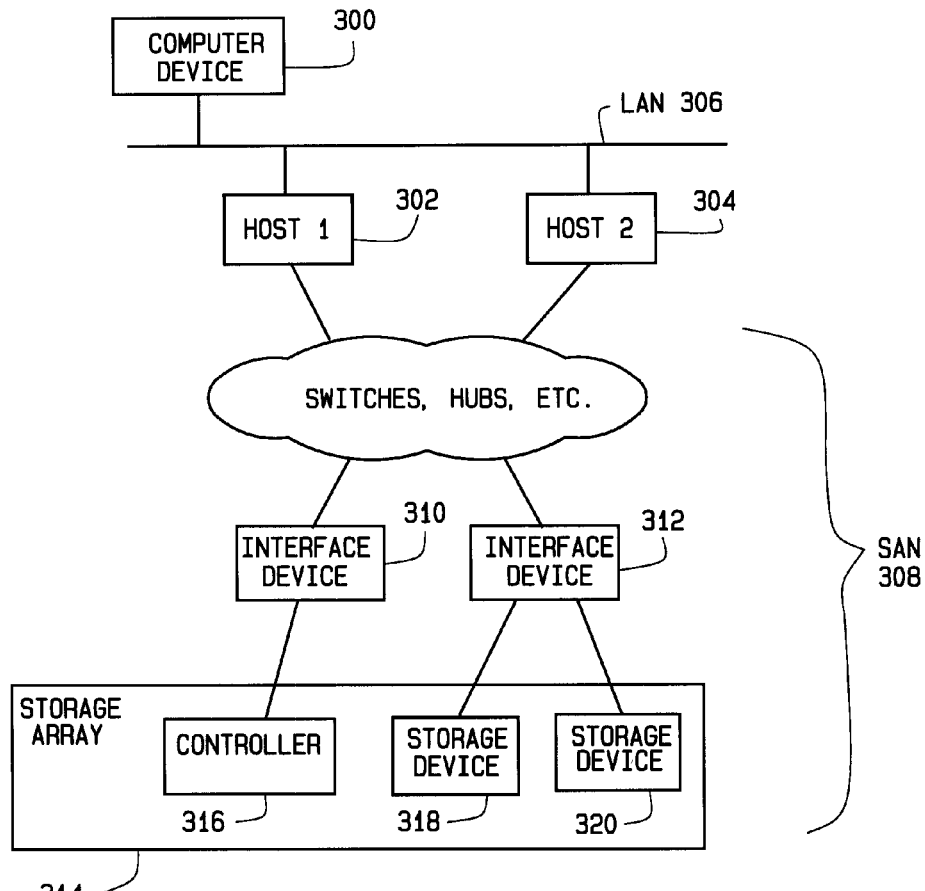
FIG. 3 is a block diagram of a simplified SAN connected to a computer device according to one embodiment of the present invention.

Referring to FIG. 3, the computer device is indicated generally by reference character 300, and is shown connected to hosts 302, 304 via a local area network (LAN) 306. The hosts 302, 304 are connected to a SAN 308 which may include several switches, hubs, etc. connected to, among other things, interface devices 310, 312. As shown in FIG. 3, the SAN 308 also includes a storage array 314 having a controller 316 and multiple storage devices 318, 320 associated therewith. As further described below, the controller 316 performs certain control functions for the storage array 314 and, in some implementations, may itself constitute a storage device as well. The controller 316 is connected to the interface device 310, and the storage devices 318, 320 are connected to the interface device 312, as shown in FIG. 3.

In order to produce a topology map for the SAN 308, one or both of the hosts 302, 304 may detect the storage array 314 (by detecting the controller 316) attached to the interface device 310, as well as the storage device 318 attached to the interface device 312, using conventional (or other) techniques. The computer device 300 can then determine whether (or, in this particular example, the fact that) the detected storage device 318 is one of the storage devices associated with the detected storage array 314. One exemplary method that can be implemented by the computer device 300 for this purpose is shown in FIG. 4 and indicated generally by reference character 400.

Figure 4:
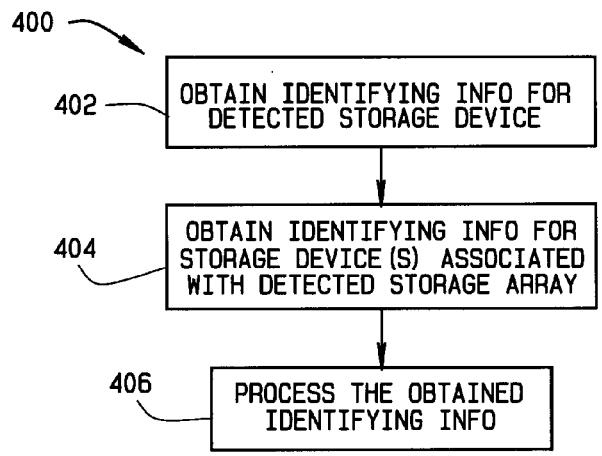
FIG. 4 is a flow diagram of a method implemented by the computer device of FIG. 3.

As shown in FIG. 4, the exemplary method 400 includes the step 402 of obtaining identifying information for a detected storage device. With respect to the detected storage device 318 of FIG. 3, this identifying information can be obtained, for example, from the storage device 318 via the interface device 312 and the host 304. The method 400 also includes the step 404 of obtaining identifying information for the storage device(s) associated with a detected storage array. With respect to the detected storage array 314 of FIG. 3, this identifying information can be obtained, for example, from the controller 316 via the interface device 310 and the host 302. In step 406, the identifying information obtained in steps 402, 404 is processed to determine whether the detected storage device is one of the one or more storage devices associated with the detected storage array. This may include, for example, comparing the identifying information for the detected storage device 318 with the identifying information for each storage device associated with the detected storage array 314 to identify a potential match, which would indicate that the detected storage device 318 is associated with the detected storage array 314 (as is the case in this particular example).

In one embodiment, the identifying information obtained in steps 402, 404 is serial number information for the respective storage devices, but those skilled in the art will appreciate that other types of identifying information can be used.

While the method 400 of FIG. 4 was described above in the context of determining whether the storage device 318 is associated with the storage array 314, it should be understood that the same method can be used to determine whether the storage device 320 is associated with the storage array 314. It should also be understood that the method 400 can be advantageously used regardless of whether the storage devices 318, 320 are connected to the same or different interface devices (or no interface devices), including where the storage devices 318, 320 and the storage array 314 are all attached to the same interface device (which may be a bridge, switch, hub, or any other type of interface device).

Figure 1:
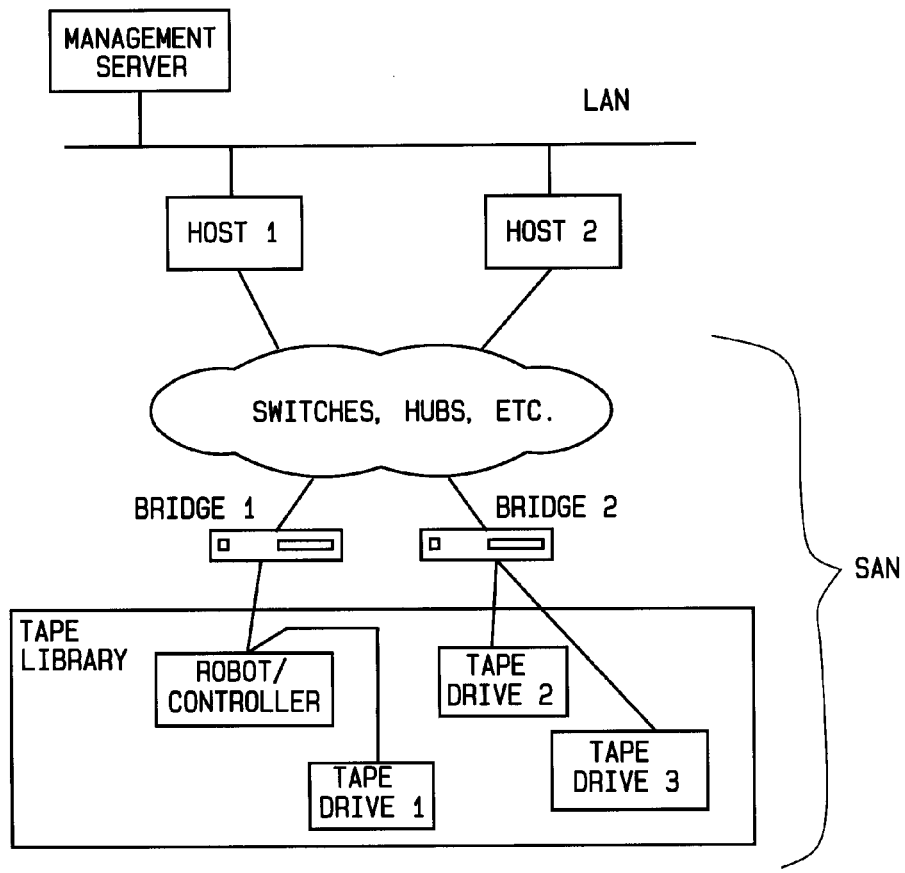
FIG. 1 is a block diagram of a simplified storage area network (SAN) of the type known in the prior art.
Figure 2:
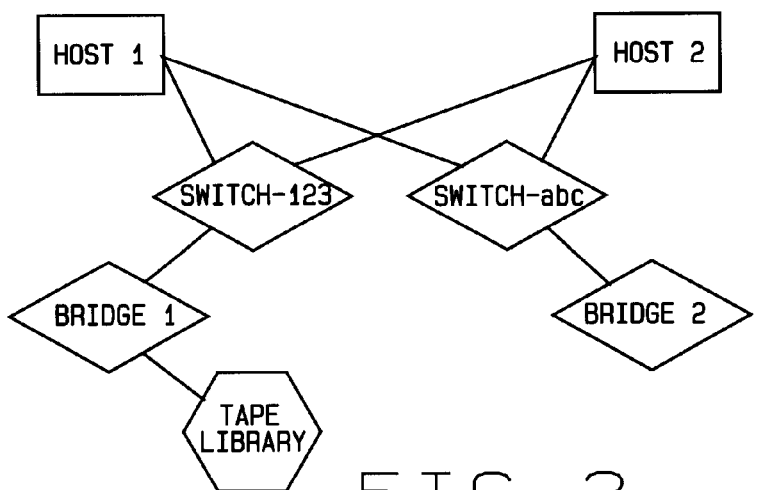
FIG. 2 illustrates a prior art topology map for the SAN shown in FIG. 1.
Figure 5:
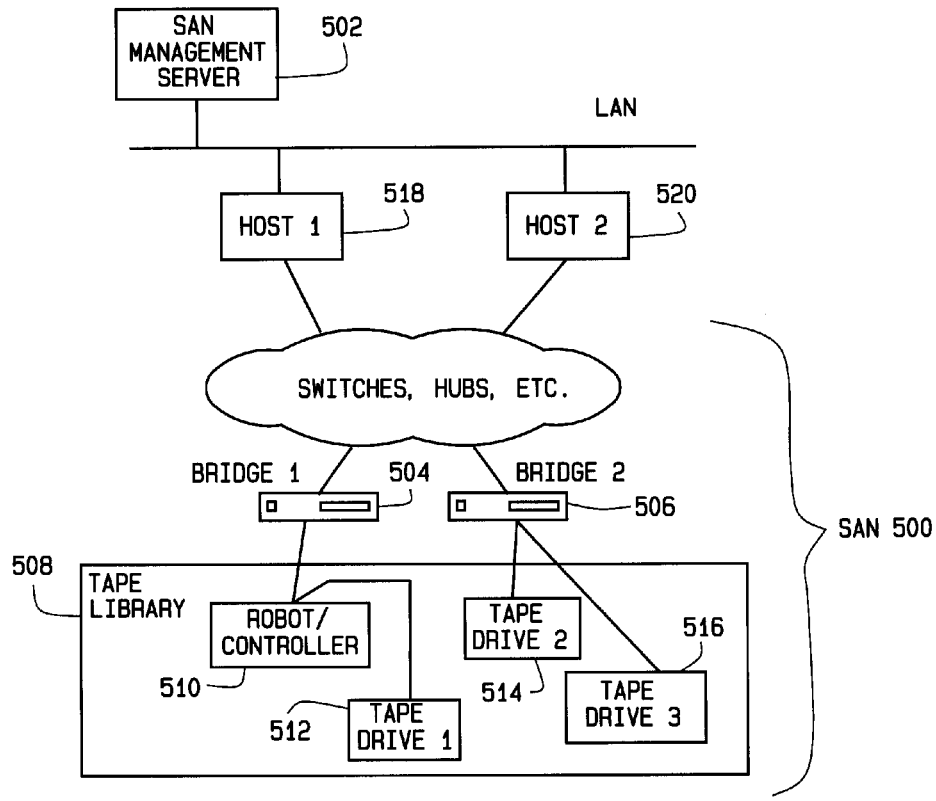
FIG. 5 is a block diagram of a simplified SAN connected to a SAN management server according to another embodiment of the present invention.

Another exemplary embodiment of the present invention will now be described with reference to FIG. 5, which depicts a simplified SAN 500 similar to that of FIG. 1. Unlike the management server of FIG. 1, however, the management server 502 shown in FIG. 5 is configured to produce a topology map that accurately depicts the links and/or associations of the bridges, tape drives and tape library of the SAN 500 by implementing the method 600 of FIG. 6. Additionally, it should be noted that the bridges 504, 506 shown in FIG. 5 are fiber channel (FC)—small computer serial interface (SCSI) bridges, and the tape library 508 (including its associated robot/controller 510 and tape drives 512, 514, 516) is attached to the FC-SCSI bridges 504, 506 via SCSI ports (not shown). Accordingly, in this particular embodiment, standard SCSI commands can be used to communicate with the tape library 508.

Figure 6:
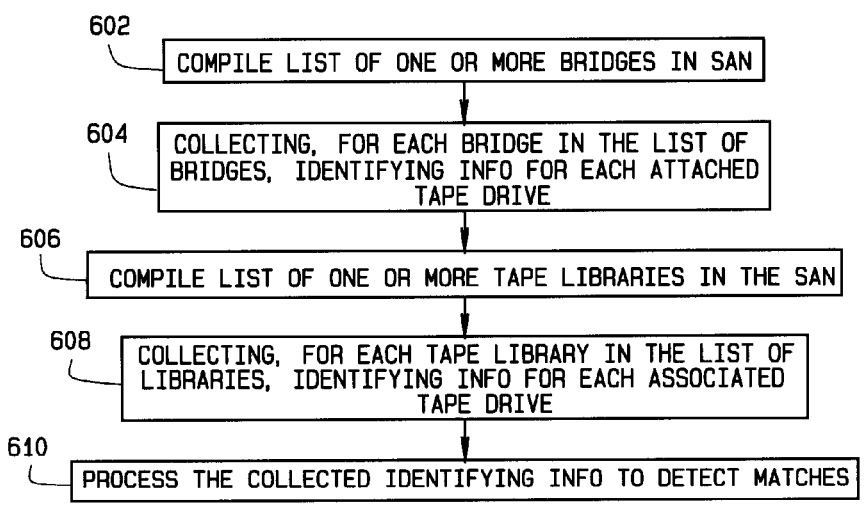
FIG. 6 is a flow diagram of a method implemented by the SAN management server shown in FIG. 5.

Referring now to FIG. 6, the method 600 includes the step 602 of compiling a list of one or more bridges in the SAN. For the SAN 500 shown in FIG. 5, this list would preferably include bridges 504, 506. In one preferred implementation, the OpenDIAL component of the OpenView Storage Area Manager (OV SAM) application available from Hewlett-Packard Company runs on each of the hosts 518, 520 shown in FIG. 5, and reports on detected storage devices and LUNs (including LUNs corresponding to bridges 504, 506) to the management server 502.

Step 604 of FIG. 6 includes collecting, for each bridge in the list of bridges, identifying information for each tape drive attached thereto. For the SAN 500 of FIG. 5, this would include collecting identifying information for the tape drive 512 attached to bridge 504, and for the tape drives 514, 516 attached to bridge 506. This can be accomplished by, for example, sending each bridge 504, 506 a ReportLuns command to obtain the LUNs for logical units (LUs) known to that bridge. In response to this command, each bridge will report a LUN for each tape drive and any robot/controller connected to its SCSI ports. For each reported LUN, a Virtual Inquiry (page 0x80) command can be sent to the appropriate bridge, which will respond with serial number information for the corresponding tape drive or robot/controller. This is preferably done using a Device Plug In (DPI) for each bridge, which implement the standard "AttachedDevices" interface.

Step 606 of FIG. 6 includes compiling a list of one or more tape libraries in the SAN. For the SAN 500 of FIG. 5, this would include tape library 508. In one preferred implementation, this function is also supported by the OpenDIAL component noted above.

Step 608 of FIG. 6 includes collecting, for each tape library in the list of tape libraries, identifying information for each tape drive associated therewith. For the SAN 500 of FIG. 5, this would include collecting identifying information for the tape drives 512, 514, 516 which are associated with the tape library 508. This can be accomplished by, for example, sending a Mode Sense (Element Addressing) command to the robot/controller 510, which will respond with the starting addresses for data corresponding to the tape drives 512-516. Using these addresses, ReadElementStatus commands can be successively sent to the robot/controller 510 to obtain serial number information for each of the tape drives 512-516 associated with the tape library 508. These is preferably done using a DPI for the tape library 508, which implements the standard "InternalDrives" interface.

Figure 7:
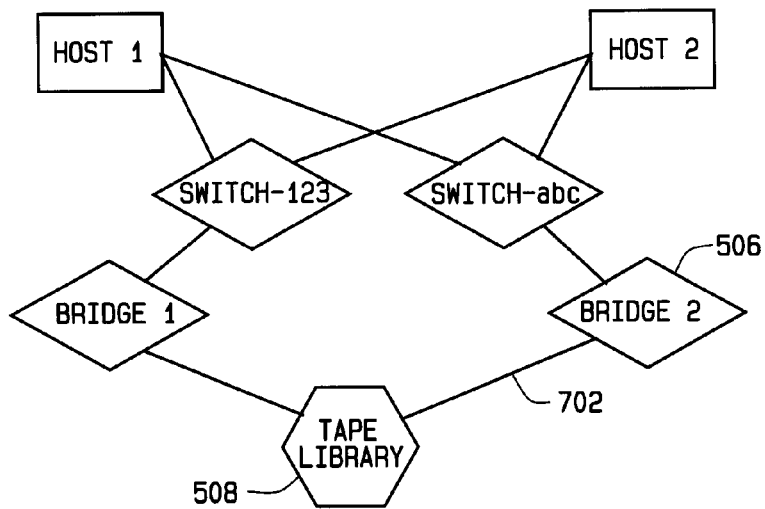
FIG. 7 illustrates a topology map produced for the simplified SAN of FIG. 5.
Figure 8:
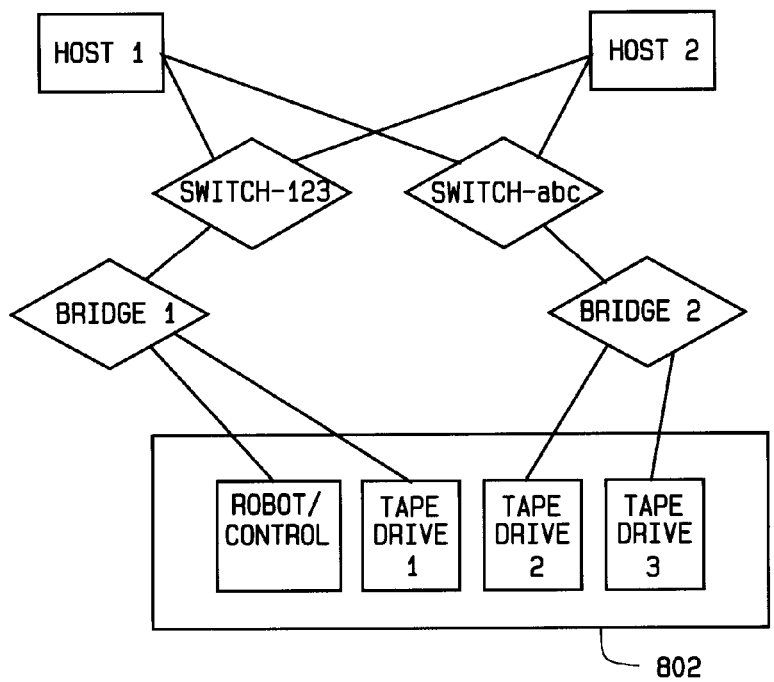
FIG. 8 illustrates an alternative topology map produced for the simplified SAN of FIG. 5.

Step 610 of FIG. 6 includes processing the collected identifying information to detect matches. For the SAN 500 of FIG. 5, this may include comparing the collected serial number information for the tape drives attached to each bridge with the collected serial number information for the tape drives internal to the tape library. In this manner, the management server 502 of FIG. 5 can determine whether (or, in this example, the fact that) the tape drives 512-516 are associated with the tape library 508. Having determined this information, the management server 502 can produce a topology map of the SAN 500. One example of such a map is shown in FIG. 7, where the association of the tape drives 512-516 (not shown) with the tape library 508 is depicted by the link 702 between the bridge 506 and the tape library 508. Another example of a topology map which the management server 502 may produce for the SAN 500 is shown in FIG. 8, where the individual tape drives 512-516 and the robot/controller 510 are shown, and where the association of such devices with the tape library 508 is depicted by the box 802.

In one preferred implementation, the above-referenced commands are sent from the management server 502 to the noted devices through as many different hosts as necessary. In this manner, a direct connection between the management server 502 and the SAN 500 is not strictly necessary. Alternatively, a direct connection can be implemented for this purpose.

Although the embodiment described immediately above relates primarily to tape libraries and associated tape drives, it should be understood that the teachings of the invention are not so limited, and relate more broadly to identifying associations (when applicable) between detected storage devices and detected storage arrays.

The description of the invention is merely exemplary in nature and, thus, variations that do not depart from the gist of the invention are intended to be within the scope of the invention. Such variations are not to be regarded as a departure from the spirit and scope of the invention.

What is claimed:

1. A computerized method of determining whether a storage device attached to an interface device in a storage area network (SAN) is associated with a storage array in the SAN, the method comprising:
    obtaining, by a computer, information identifying the storage device from the interface device to which the storage device is attached;
    identifying, by the computer, a storage array in the SAN;
    obtaining, by the computer, information identifying each of one or more storage device associated with the storage array from the storage array; and
    defining, by the computer, a link between the interface device and the storage array upon determining that the storage device attached to the interface device is one of the storage devices associated with the storage array.

2. The computerized method of claim 1 wherein the interface device connects the storage device to a host coupled to the SAN.

3. The computerized method of claim 1 further comprising generating a topology map for at least a portion of the SAN.

4. The computerized method of claim 3 wherein generating includes illustrating a link on the topology map between the interface device and the storage array upon determining that the storage device attached to the interface device is one of the storage devices associated with the storage array.

5. The computerized method of claim 3 wherein generating includes illustrating an association of the storage device attached to the interface device with the storage array on the topology map upon determining that the storage device attached to the interface device is one of the storage devices associated with the storage array.

6. The computerized method of claim 1 wherein the interface device is a bridge.

7. The computerized method of claim 6 wherein the bridge is a FC-SCSI bridge.

8. The computerized method of claim 1 wherein the storage array is a tape library and the storage devices are tape drives.

9. The computerized method of claim 1 wherein the information identifying the storage device attached to the interface device is obtained from the interface device.

10. The computerized method of claim 1 wherein the information identifying each of the one or more storage devices associated with the storage array is obtained from the storage array.

11. The computerized method of claim 1 wherein the information identifying the storage device attached to the interface device and the information identifying each of the one or more storage devices associated with the storage array is serial number information.

12. A non-transitory computer-readable storage medium storing computer-executable instructions for performing the method of claim 1.

13. A non-transitory computer readable storage medium as in claim 12, wherein the interface device connects the storage device to a host coupled to the SAN.

14. A computerized method comprising:
    collecting, by a computer, a list of bridges and tape libraries in a storage area network (SAN);
    obtaining, by the computer, from each said bridge identifying information for each tape drive associated therewith;
    obtaining, by the computer, from each said tape libraries identifying information for each tape drive associated therewith;
    defining, by the computer, a link between a given bridge and a given tape library upon determining that a tape drive associated with the given bridge is a tape drive associated with the given tape library; and
    producing, by the computer, a topology map for the SAN using the link between the given bridge and the given tape library.

15. A computerized method of determining whether a tape drive attached to a FC-SCSI bridge in a storage area network (SAN) is associated with a tape library in the SAN, the tape library having a plurality of tape drives associated therewith, the method comprising:
    obtaining, by a computer, identifying information for the tape drive attached to the FC-SCSI bridge;
    obtaining, by the computer, identifying information for each of the plurality of tape drives associated with the tape library; and
    processing, by the computer, the obtained identifying information to determine whether the tape drive attached to the FC-SCSI bridge is one of the plurality of tape drives associated with the tape library.

* * * * *